US012754077B2

(12) United States Patent
Zhu et al.

(10) Patent No.: US 12,754,077 B2
(45) Date of Patent: Oct. 6, 2026

(54) SENSOR SYSTEM AND METHOD THEREFOR

(71) Applicant: HUAWEI TECHNOLOGIES CO., LTD., Shenzhen (CN)

(72) Inventors: Qian Zhu, Shenzhen (CN); Ganghua Yang, Shanghai (CN); Jia Jia, Shenzhen (CN); Rui Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/189,438

(22) Filed: Apr. 25, 2025

(65) Prior Publication Data

US 2025/0258042 A1 Aug. 14, 2025

Related U.S. Application Data

(63) Continuation of application No. PCT/CN2022/128303, filed on Oct. 28, 2022.

(51) Int. Cl.
*G01K 1/024* (2021.01)

(52) U.S. Cl.
CPC .................................... *G01K 1/024* (2013.01)

(58) Field of Classification Search
CPC ...... G01K 1/00; G01K 1/024; H04Q 2209/00; H04Q 2209/30; H04Q 2209/40; H04Q 2209/47
See application file for complete search history.

(56) References Cited

U.S. PATENT DOCUMENTS

| | | | | |
|---|---|---|---|---|
| 8,660,165 B2 * | 2/2014 | Hannan | H04B 7/15535 375/140 |
| 8,948,687 B2 * | 2/2015 | Hanson | H04B 7/15578 455/24 |
| 9,558,468 B2 * | 1/2017 | Donlan | G06Q 10/0833 |
| 11,723,489 B2 * | 8/2023 | Nivala | G08B 3/10 340/539.22 |
| 2010/0141536 A1 * | 6/2010 | Zhang | H01Q 9/42 343/702 |
| 2019/0212013 A1 | 7/2019 | Blum et al. | |

FOREIGN PATENT DOCUMENTS

| | | | | |
|---|---|---|---|---|
| CN | 103884374 A | | 6/2014 | |
| CN | 204102162 U | | 1/2015 | |
| CN | 204988540 U | * | 1/2016 | |
| CN | 105823565 A | | 8/2016 | |
| WO | WO-2017039072 A1 | * | 3/2017 | H04B 5/266 |
| WO | 2021038528 A1 | | 3/2021 | |

* cited by examiner

*Primary Examiner* — Franklin D Balseca

(57) ABSTRACT

A sensor system and a method therefor includes a transmission apparatus and one or more passive sensors. The transmission apparatus is disposed on an inner surface of a to-be-measured body. The passive sensor is disposed on the inner surface of the to-be-measured body and at a distance less than or equal to a first threshold from the transmission apparatus. The passive sensor is configured to sense to-be-measured information inside the to-be-measured body.

19 Claims, 7 Drawing Sheets

SENSOR SYSTEM AND METHOD THEREFOR

CROSS-REFERENCE TO RELATED APPLICATIONS

This application is a continuation of International Application No. PCT/CN2022/128303, filed on Oct. 28, 2022, the disclosure of which is hereby incorporated by reference in its entirety.

TECHNICAL FIELD

The present disclosure relates to the measurement field, and more specifically, to a sensor system and a corresponding method.

BACKGROUND

In the measurement field, a passive sensor is a common measurement component, which may be attached to a to-be-measured body, and is configured to measure to-be-measured information about a point on the to-be-measured body. The passive sensor may be used in many scenarios, for example, in a computer cabinet in which parameters such as ambient temperature and humidity need to be monitored in real time. To monitor an ambient parameter in real time, the passive sensor for sensing the ambient parameter may be disposed in the cabinet. The passive sensor may be connected to an anti-metal radio frequency identification (RFID) tag. To transmit measurement information to a control center, an excitation source needs to charge the RFID tag first, and then the excitation source continuously sends a monophonic signal. The RFID tag modulates the measurement information onto a received signal and reflects the signal. In addition, a signal receiving apparatus associated with the passive sensor may receive the signal reflected by the tag and demodulate the signal, to read the measurement information about a to-be-measured point.

An existing solution proposes a manner of placing an antenna of the signal receiving apparatus in the to-be-measured body, in which the antenna is connected to the signal receiving apparatus in a wired manner outside the to-be-measured body, and the tag is activated and information is read in a wireless manner inside the to-be-measured body. This manner has many disadvantages. For example, there are many transmission lines outside the to-be-measured body, resulting in high deployment labor costs. In addition, because there are many facilities inside the to-be-measured body, the facilities may be seriously blocked by each other, causing coverage blind spots. Due to limited space in the to-be-measured body, antenna deployment is difficult. In addition, because a far-field antenna is used, a metal cabinet and a server affect impedance matching of the antenna, which easily causes an impedance mismatch, and causes most energy to be reflected back to a radio frequency circuit. Therefore, the existing manner still needs to be improved.

SUMMARY

To overcome at least the foregoing problem and other potential problems, embodiments of the present disclosure provide a sensor system and a corresponding method.

According to a first aspect of the present disclosure, a sensor system is provided. The system includes: a transmission apparatus, disposed on an inner surface of a to-be-measured body; and one or more passive sensors, disposed on the inner surface of the to-be-measured body and at a distance less than or equal to a first threshold from the transmission apparatus, where the passive sensor is configured to sense to-be-measured information inside the to-be-measured body.

According to embodiments of the present disclosure, a conformal transmission apparatus disposed on the to-be-measured body resolves a problem of uneven energy distribution caused by metal blocking inside the to-be-measured body, reduces coverage blind spots, and reduces electromagnetic interference.

In an implementation of the first aspect, the sensor system further includes a processing apparatus, coupled to the transmission apparatus and configured to process a sensing signal from the passive sensor. In this implementation, the to-be-measured information inside the to-be-measured body may be obtained through the passive sensor, and the to-be-measured information is further utilized, to ensure that a facility using the sensor system can safely operate in an energy-saving manner.

In an implementation of the first aspect, the processing apparatus and the transmission apparatus are connected through a wired transmission component or in a wireless manner. In this implementation, the processing apparatus and the transmission apparatus may be connected in various manners. A user can select a proper connection mode based on different scenarios and costs consideration.

In an implementation of the first aspect, the processing apparatus is disposed outside space formed by the to-be-measured body, and the sensor system further includes: a first antenna, used for transmission to the transmission apparatus; and a second antenna, used for transmission to the processing apparatus, and configured to communicate with the first antenna, to transmit the sensor signal from the passive sensor to the processing apparatus through the transmission apparatus by using an electromagnetic wave of a first frequency. In this implementation, wireless transmission may be implemented in an antenna communication manner. This transmission manner can reduce or even avoid wiring in a wired manner, thereby facilitating on-site installation and implementation.

In an implementation of the first aspect, the sensor system further includes a charging apparatus, coupled to the transmission apparatus and configured to charge the passive sensor by using an electromagnetic wave of a second frequency. In this implementation, working of the passive sensor can be ensured.

In an implementation of the first aspect, the sensor system further includes an isolation apparatus, disposed between the first antenna and the transmission apparatus. In this implementation, communication between the passive sensor and the processing apparatus is assisted, thereby reducing a threshold of the passive sensor.

In an implementation of the first aspect, the sensor system further includes a distribution apparatus, disposed between the isolation apparatus and the transmission apparatus, where an input end of the distribution apparatus is connected to the isolation apparatus, a first output end of the distribution apparatus is connected to the charging apparatus, and a second output end of the distribution apparatus is connected to the transmission apparatus; and the charging apparatus is configured to charge the passive sensor based on a signal of the distribution apparatus. In this implementation, the charging apparatus can be properly and flexibly controlled to charge the passive sensor.

In an implementation of the first aspect, the distribution apparatus includes either of a directional coupler and a power splitter. In this implementation, various types of distribution apparatuses may be used to control charging of the passive sensor.

In an implementation of the first aspect, the sensor system further includes an isolation apparatus, disposed between the wired transmission component and the transmission apparatus. In this implementation, communication between the passive sensor and the processing apparatus is assisted, thereby reducing a threshold of the passive sensor.

In an implementation of the first aspect, the isolation apparatus includes a duplexer, and the duplexer is configured to work when the first frequency is equal to the second frequency. In this implementation, the sensor system can work when a charging frequency is equal to a communication frequency.

In an implementation of the first aspect, the isolation apparatus includes a filter, and the filter is configured to work when the first frequency is not equal to the second frequency. In this implementation, the sensor system can work when the charging frequency is not equal to the communication frequency.

In an implementation of the first aspect, the charging apparatus includes a continuous wave exciter or a radio frequency signal generator. In this implementation, various types of charging apparatuses may be used to charge the passive sensor.

In an implementation of the first aspect, the sensor system further includes a power amplifier, coupled between the transmission apparatus and the processing apparatus, and configured to amplify the sensor signal from the transmission apparatus. In this implementation, the passive sensor can work by amplifying power.

In an implementation of the first aspect, the processing apparatus is disposed in the space formed by the to-be-measured body. In this implementation, coverage blind spots are reduced, and reading stability is improved.

In an implementation of the first aspect, the to-be-measured body includes a plurality of body parts that are movable relative to each other, the transmission apparatus includes a plurality of adjacent transmission sections, each transmission section is located on a corresponding body part and has two end parts, and the end part is connected to a waveguide through an adapter element; and when the plurality of body parts are on a first relative position, a distance between a waveguide connected to an end part of a transmission section and a waveguide connected to an end part of an adjacent transmission section is less than a second threshold. In this implementation, when the to-be-measured body is in a disconnected state to a specific extent, it can still be ensured that signal transmission is not affected.

In an implementation of the first aspect, the end part includes a magnetic element, and magnetic elements are configured to attract each other when the end part is close to the end part of the adjacent transmission section, so that the end part is aligned to the end part of the adjacent transmission section. In this implementation, alignment between transmission sections can be assisted, thereby ensuring quality of a transmitted signal.

In an implementation of the first aspect, the transmission apparatus includes a non-closed transmission line. In this implementation, energy leaked by the transmission apparatus in a transmission process may be coupled to the passive sensor, to implement charging of the sensor and communication with a signal receiving apparatus.

In an implementation of the first aspect, the transmission apparatus is coupled to a near-field antenna. In this implementation, electromagnetic interference can be reduced, and security and reliability can be improved.

In an implementation of the first aspect, the transmission apparatus is coupled to a far-field antenna. In this implementation, a signal coverage area can be improved, and flexibility of a position of the passive sensor can be improved.

According to a second aspect of the present disclosure, a method for the sensor system according to the first aspect is provided. The method includes: sensing the to-be-measured information inside the to-be-measured body through the passive sensor; and processing the sensing signal from the passive sensor.

In an implementation of the second aspect, the method includes: controlling working of the passive sensor through the transmission apparatus.

It should be understood that the content described in the summary is not intended to limit key or important features of implementations of the present disclosure or limit the scope of the present disclosure. Other features of the present disclosure will be readily understood through the following description.

BRIEF DESCRIPTION OF DRAWINGS

With reference to the accompanying drawings and the following detailed descriptions, the foregoing and other features, advantages, and aspects of embodiments of the present disclosure become more apparent. In the accompanying drawings, same or similar reference numerals indicate same or similar elements.

DESCRIPTION OF EMBODIMENTS

The following describes implementations of the present disclosure in more detail with reference to the accompanying drawings. Although some implementations of the present disclosure are shown in the accompanying drawings, it should be understood that the present disclosure may be implemented in various forms, and should not be construed as being limited to the implementations described herein. On the contrary, these implementations are provided for a more thorough and complete understanding of the present disclosure. It should be understood that the accompanying drawings and implementations of the present disclosure are merely used as examples and are not intended to limit the protection scope of the present disclosure.

In the descriptions of implementations of the present disclosure, the term “including” and similar terms should be understood as non-exclusive inclusions, that is, “including but not limited to”. The term “based on” should be understood as “at least partially based on”. The term “one implementation” or “this implementation” should be understood as “at least one implementation.” The terms “first”, “second”, and the like may indicate different objects or a same object. The term “and/or” indicates at least one of two items associated with the term. For example, “A and/or B” indicates A, B, or A and B. The following may further include other explicit and implied definitions. In addition, the terms “connection”, “coupling”, “coupling connection”, and the like may indicate that related components are associated in different forms, including mechanical association, and association in an electrical manner, a magnetic manner, a thermal manner, or the like. The association includes direct association and indirect association through an intermediate component.

It should be understood that, in the technical solutions provided in the implementations of this disclosure, some repeated parts may not be described in the following descriptions of specific implementations, but it should be considered that these specific implementations are mutually referenced and may be combined with each other.

To resolve at least the foregoing problem, an implementation of the present disclosure provides an improved sensor system and a corresponding use method. The following describes some schematic implementations of the present disclosure with reference to the accompanying drawings.

Figure 1:
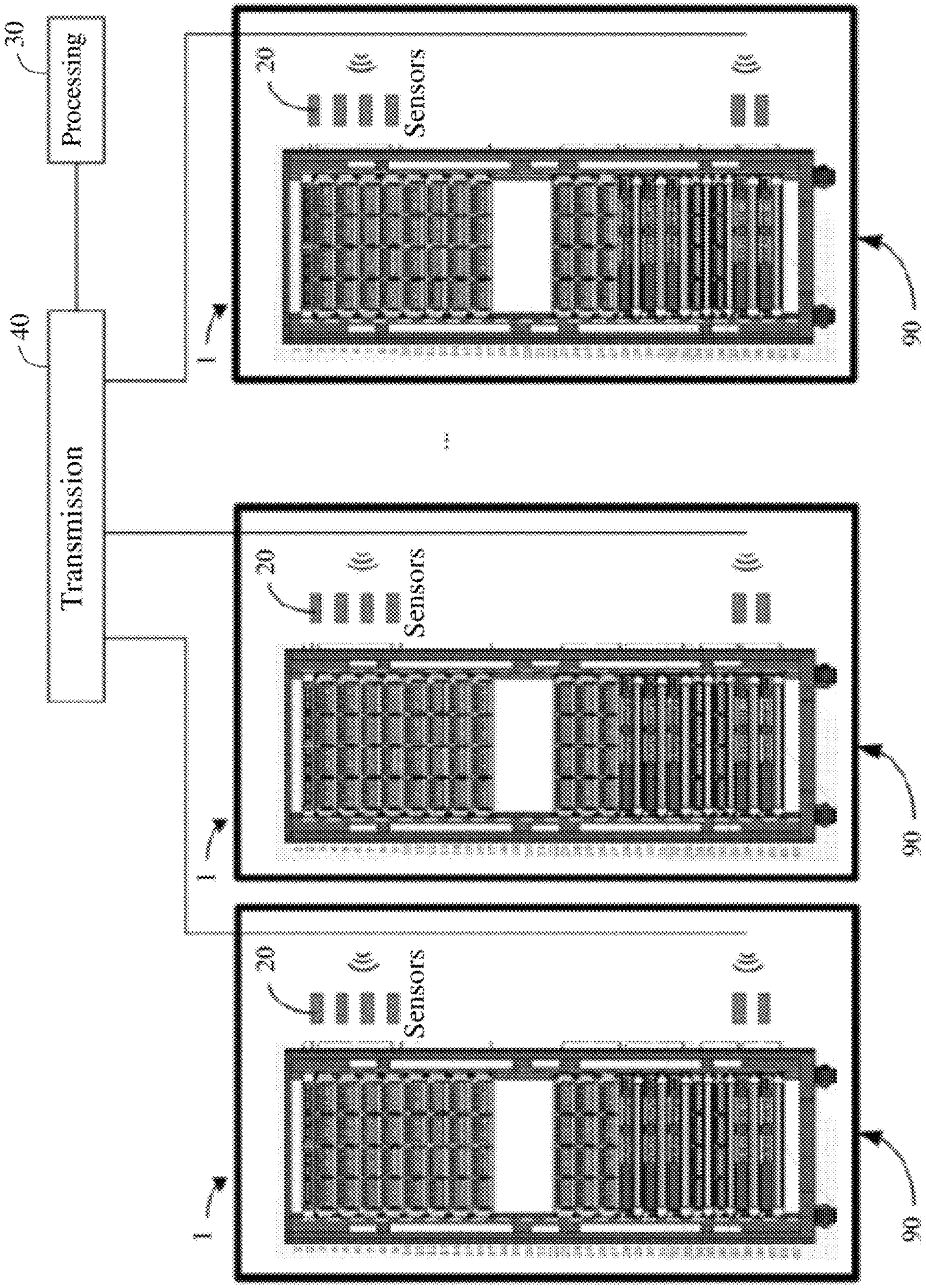
FIG. 1 shows a schematic scenario to which a sensor system is applicable according to an example implementation of the present disclosure.

FIG. 1 shows a schematic scenario to which an example implementation of the present disclosure is applicable. As shown in FIG. 1, one or more to-be-measured bodies 90 may be disposed in the scenario, and each to-be-measured body 90 is associated with one sensor system 1. Some schematic implementations of the present disclosure are described by using temperature measurement in a computer cabinet as an example. In this scenario, the to-be-measured body 90 is a computer cabinet, and many computers may be disposed inside the computer cabinet, to perform various computing operations. The sensor system 1 according to this embodiment of the present disclosure may monitor environment information such as a temperature and humidity in the computer cabinet, and can change an environment in the computer cabinet when necessary. It should be understood that this embodiment of the present disclosure is further applicable to various other different use scenarios, for example, may be used for measuring a concentration of dangerous goods during storage and transportation.

As shown in FIG. 1, each sensor system 1 includes one or more passive sensors 20. These passive sensors 20 may communicate with a processing apparatus 30 through a transmission component 40, so that the processing apparatus 30 can learn of a measurement result of the passive sensor 20. It may be understood that a quantity of to-be-measured bodies 90 is not limited in embodiments of the present disclosure. It should be further understood that a quantity of passive sensors 20 in each sensor system 1 may be determined based on an actual use requirement, and is not limited in this embodiment of the present disclosure either.

Figure 2:
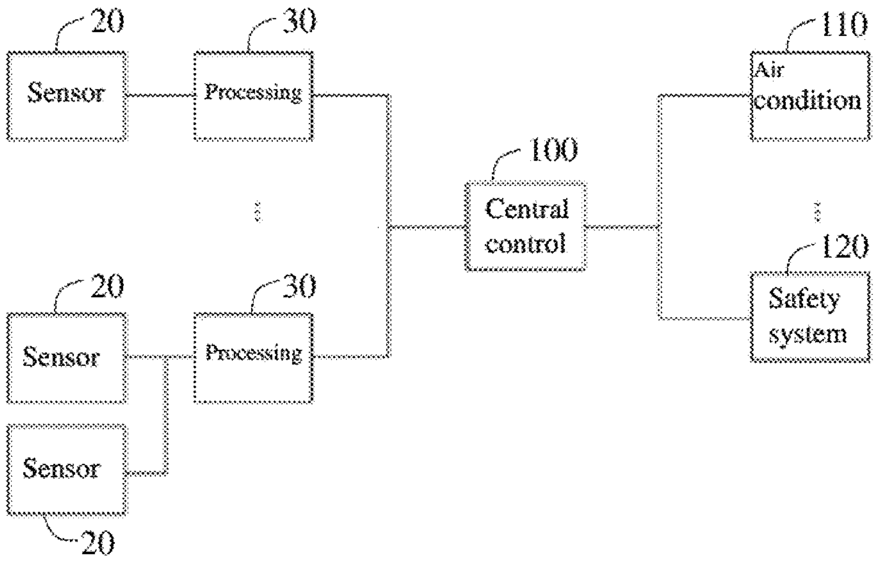
FIG. 2 shows a network implementation solution that may be used by a sensor system according to an example implementation of the present disclosure.

FIG. 2 shows a network implementation solution that may be used by the sensor system 1 according to an embodiment of the present disclosure. The solution may be specifically used to monitor a microenvironment in scenarios such as a computer cabinet, a container, an electric power cabinet, a refrigerated vehicle, and storage and transportation of a special material. Without loss of generality, unless otherwise specified, the computer cabinet is used as an example in the present disclosure. As shown in FIG. 2, various sensing signals of the passive sensor 20 in the computer cabinet are transmitted to the processing apparatus 30 through a transmission apparatus inside the cabinet and a transmission apparatus outside the cabinet. The transmission apparatus inside the cabinet is described in detail below with reference to FIG. 3 to FIG. 7. In general, the transmission apparatus outside the cabinet may be a wireless or wired transmission apparatus, and a specific structure of the transmission apparatus outside the cabinet is also described in detail below with reference to FIG. 3 to FIG. 7. As shown in FIG. 2, the processing apparatus 30 may also read the signal from the passive sensor 20 at a particular moment or periodically based on an instruction of a central control apparatus 100. The one or more processing apparatuses 30 transmit the received sensing signal to the central control apparatus 100. The central control apparatus 100 adjusts specific settings of an air conditioning system 110 or a safety system 120 based on the monitored sensing signal. It should be understood that types of the passive sensors 20 shown in FIG. 2 may be the same or different. This is not particularly limited in embodiments of the present disclosure.

FIG. 3 to FIG. 7 show the sensor system 1 according to different embodiments of the present disclosure. As shown in FIG. 3 to FIG. 7, the sensor system 1 generally includes a transmission apparatus 10 and one or more passive sensors 20. The transmission apparatus 10 is disposed on an inner surface of a to-be-measured body 90. The passive sensor 20 is disposed on the inner surface of the to-be-measured body 90, and a distance between the passive sensor 20 and the transmission apparatus 10 is less than or equal to a first threshold, to ensure good communication between the passive sensor 20 and the transmission apparatus 10. A function of the passive sensor 20 is to sense to-be-measured information inside the to-be-measured body 90. In some embodiments, the passive sensor 20 may be a temperature sensor. Therefore, temperature information about a to-be-measured point inside the to-be-measured body 90 may be obtained by reading a signal from the passive sensor 20. It should be understood that the passive sensor 20 may alternatively be another type of sensor, including but not limited to: a humidity sensor, an airflow sensor, a dust sensor, a smoke sensor, a door status sensor, a U space sensor, an article sensor, and the like. A specific form of the sensor is not limited in embodiments of the present disclosure.

In some embodiments, the transmission apparatus 10 may be in a form of transmission line. In this way, if the sensor system 1 includes a plurality of passive sensors 20, these passive sensors 20 may be arranged along the transmission line and close to the transmission line. In some embodiments, the passive sensor 20 may be directly attached to or near the transmission apparatus 10. In a further embodiment, the transmission line may be in a non-closed (that is, exposed) form, for example, a microstrip. Therefore, energy leaked in a transmission process of the microstrip is efficiently coupled to the passive sensor 20, to ensure effective signal transmission. According to this embodiment of the present disclosure, because the transmission apparatus 10 may be freely and flexibly disposed on the inner surface of the to-be-measured body 90, a trace of the transmission apparatus 10 may be conformal to a surface of the to-be-measured body 90. Therefore, signal transmission of the sensor system 1 may be implemented in a conformal transmission manner. Charging and communication of the passive sensor 20 are implemented in an efficient conformal transmission manner. In addition, a structure of this conformal transmission manner may be predisposed on the surface of the to-be-measured body 90, so that an operation on an installation site is simple, labor costs are reduced, and complexity of onsite deployment is reduced.

According to embodiments of the present disclosure, a near-field coupling technology is used. In a computer cabinet use scenario, this manner reduces electromagnetic interference in the cabinet, and improves security and reliability. In some embodiments, to improve location flexibility of the passive sensor 20, a microstrip leaky-wave antenna may be used, to resolve a problem of uneven energy distribution inside the cabinet when a single antenna is used.

In some embodiments, as shown in FIG. 3 to FIG. 7, the sensor system 1 may further include the processing apparatus 30. As shown in the figure, the processing apparatus 30 may be coupled to the transmission apparatus 10 and configured to process a sensing signal from the passive sensor 20. In this way, the processing apparatus 30 may receive and read the sensing signal from the passive sensor 20, to obtain, in real time, the to-be-measured information sensed inside the to-be-measured body 90.

In some embodiments, after obtaining the sensing signal from the passive sensor 20, the processing apparatus 30 may learn of the to-be-measured information inside the to-be-measured body 90, and may further process the to-be-measured information if necessary.

Refer back to FIG. 2. When the sensor system 1 in the present disclosure is used in a computer cabinet or power cabinet scenario, the processing apparatus 30 may read, based on a configuration of the central control apparatus 100, information about a temperature sensor, a humidity sensor, and the like from the passive sensor 20 at a particular moment or periodically based on a type of the passive sensor 20, and report the information to the central control apparatus 100. In some embodiments, the central control apparatus 100 may screen out, based on information about a temperature sensor and a humidity sensor, a local hot spot with an excessively high temperature, and adjust an air speed, an air direction, and a temperature configuration of an air exhaust vent of the air conditioning system 110, to reduce a temperature of the local hot spot in time, and ensure that a computing device in the computer cabinet runs in a good environment. In this way, device security is ensured. In some other embodiments, the passive sensor 20 may alternatively be an airflow sensor. In this case, the central control apparatus 100 may alternatively monitor a running status of the air conditioning system 110 based on information that is about the airflow sensor and that is reported by the processing apparatus 30, ensures that a micro environment of the cabinet is suitable for efficient running of a computer server in combination with information about the temperature sensor and the humidity sensor, and improves efficiency of the air conditioning system 110. Because the air conditioning system 110 is dynamically turned on according to an environment condition in the computer cabinet, the air conditioning system 110 is turned off when the environment is suitable, thereby avoiding energy waste and achieving an objective of energy saving and emission reduction. In some embodiments, the passive sensor 20 may alternatively be a door status sensor. In this case, the central control apparatus 100 may also monitor, based on door status sensor information reported by the processing apparatus 30, whether a door of the computer cabinet is closed. In some other embodiments, the passive sensor 20 may alternatively be a smoke sensor. In this case, the central control apparatus 100 may monitor, based on smoke detector information, whether there is a fire hazard or the like in the computer cabinet. In another embodiment, the passive sensor 20 may alternatively be a U space detector. In this case, the central control apparatus 100 may also determine, based on information that is about the U space detector and that is reported by the processing apparatus 30, whether U space in the computer cabinet is vacant, or is used for server inventory, facilitating unified coordination and management of servers.

When the sensor system 1 in the present disclosure is used in a container scenario, the passive sensor 20 may be an article detector. In this case, the central control apparatus 100 may be configured with the processing apparatus 30 to read a signal from the article detector at a particular moment or periodically, and perform inventory on goods in the container based on the signal.

When the sensor system 1 in the present disclosure is used for storage and transportation of a special material (for example, dangerous goods), the passive sensor 20 may be a dangerous goods detector, for example, a chemical concentration detector. In this case, as shown in FIG. 2, if it is sensed that a concentration of the dangerous goods is higher than a specific threshold, the central control apparatus 100 may send an instruction to the safety system 120. In some embodiments, the safety system 120 may give an alarm to an operator, to remind the operator to take a timely and necessary measure to eliminate the danger. In some other embodiments, the safety system 120 may alternatively take a necessary action autonomously to ensure safe storage and transportation of dangerous goods, and avoid damage to safety of a person and an article.

Figure 3:
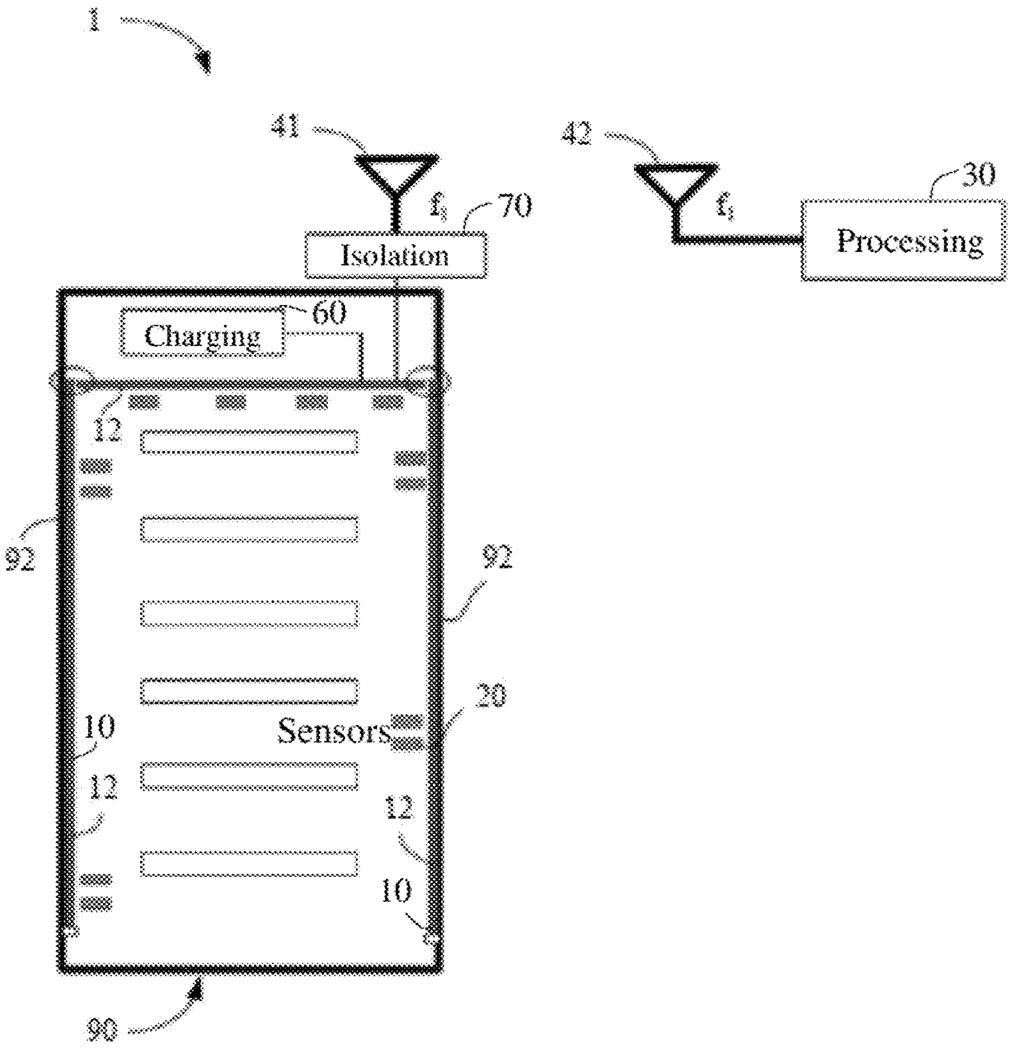
FIG. 3 is a diagram of a sensor system according to an example implementation of the present disclosure.
Figure 4:
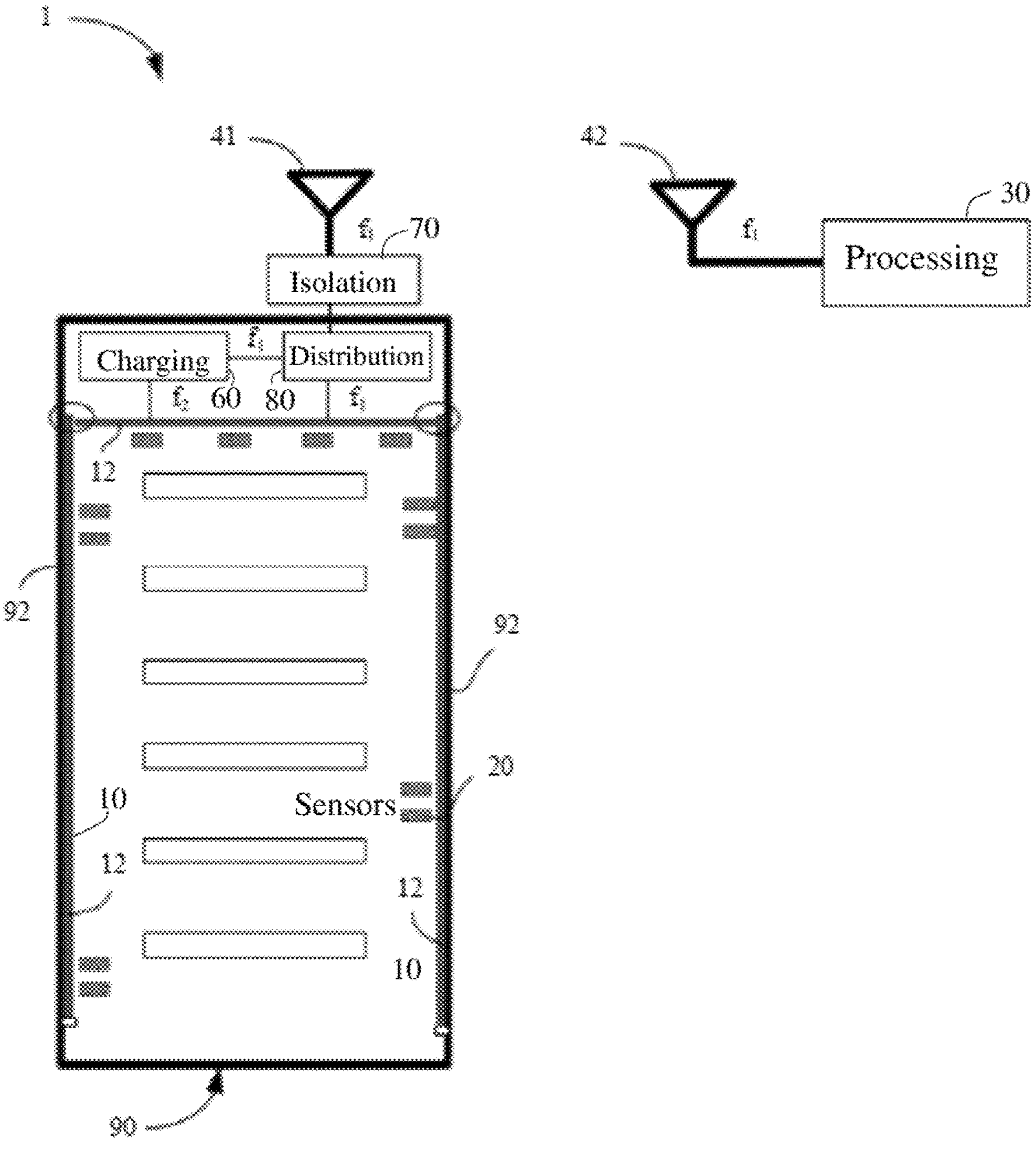
FIG. 4 is a diagram of a sensor system according to another example implementation of the present disclosure.
Figure 5:
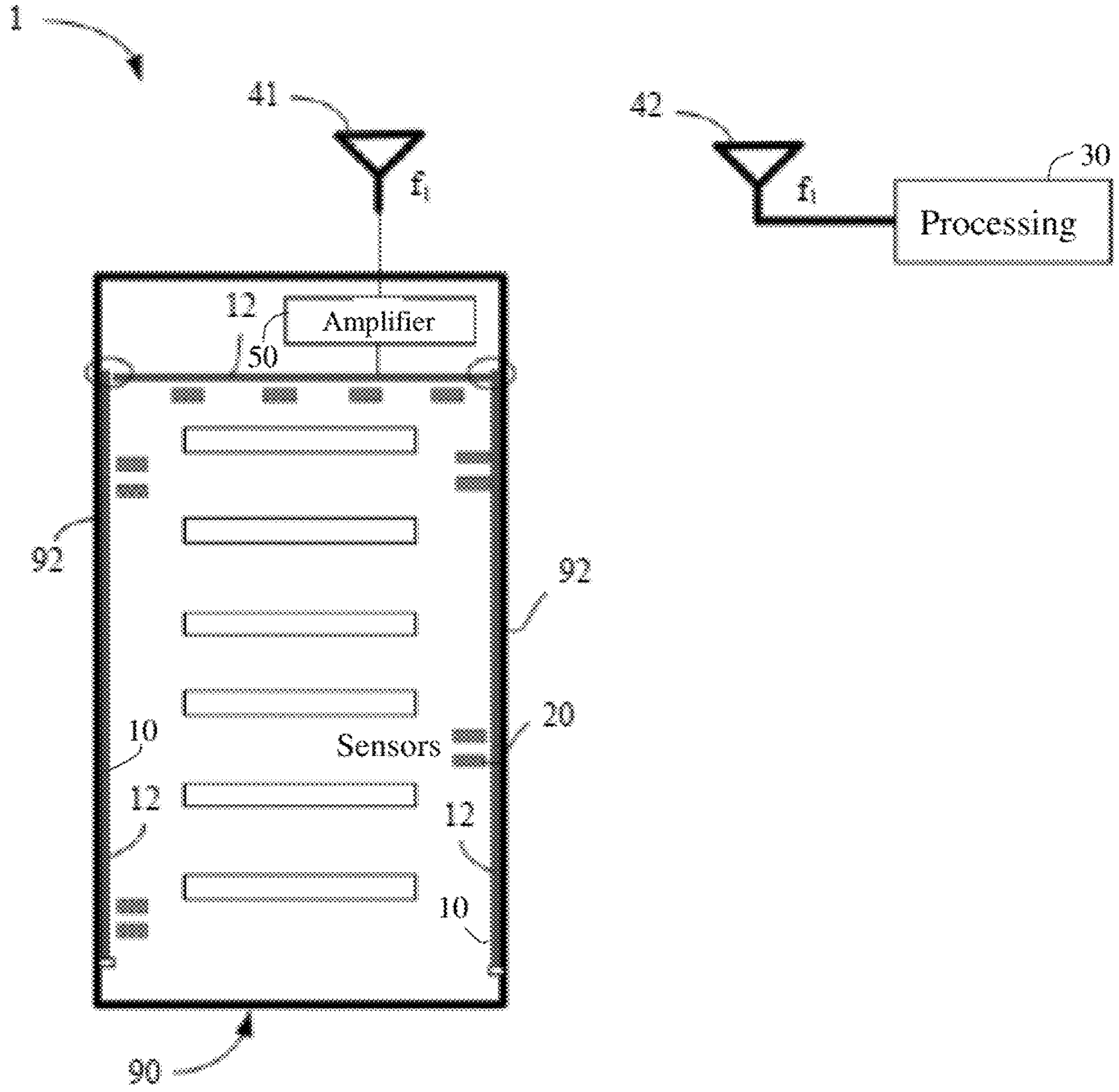
FIG. 5 is a diagram of a sensor system according to another example implementation of the present disclosure.
Figure 6:
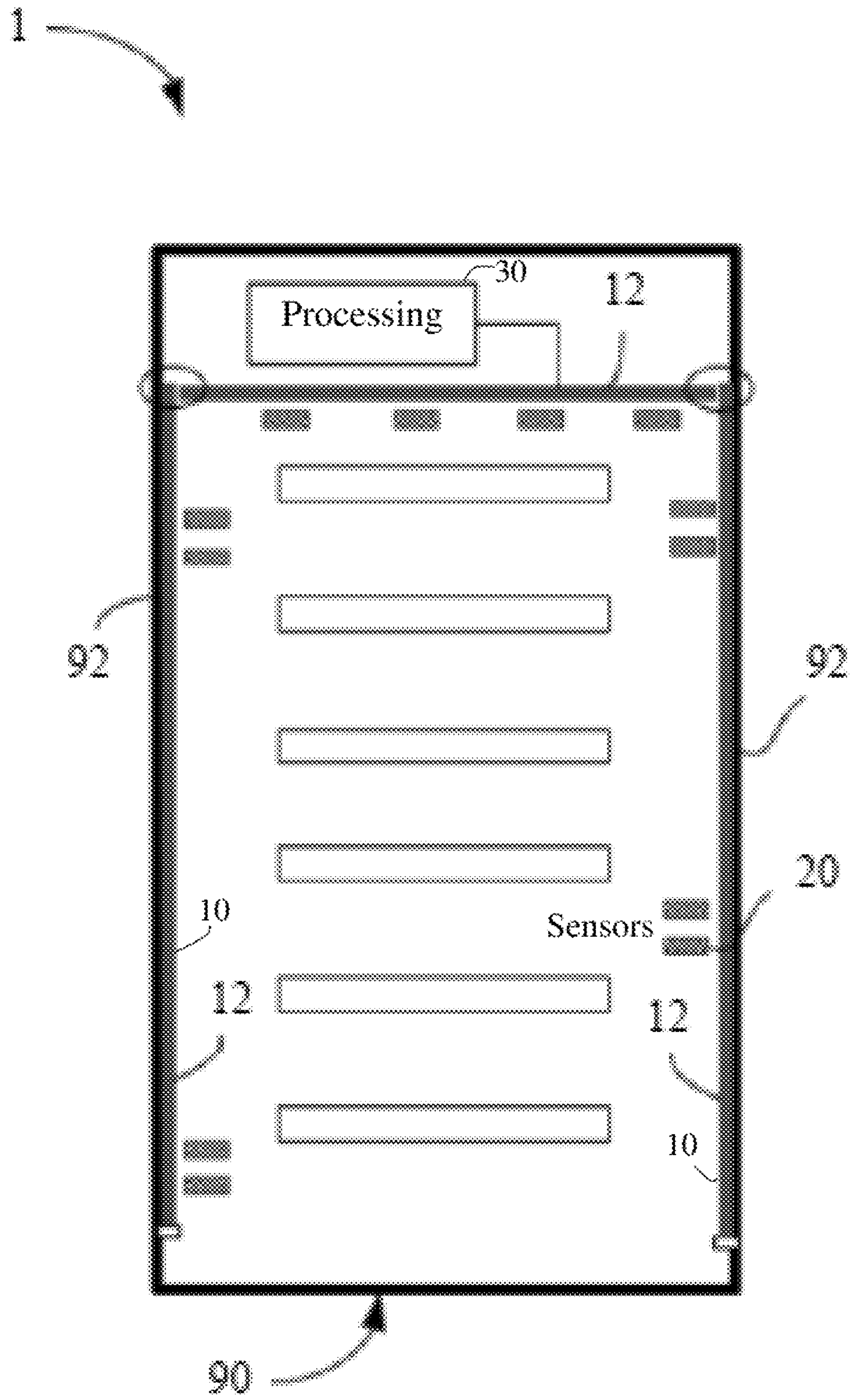
FIG. 6 is a diagram of a sensor system according to still another example implementation of the present disclosure.
Figure 7:
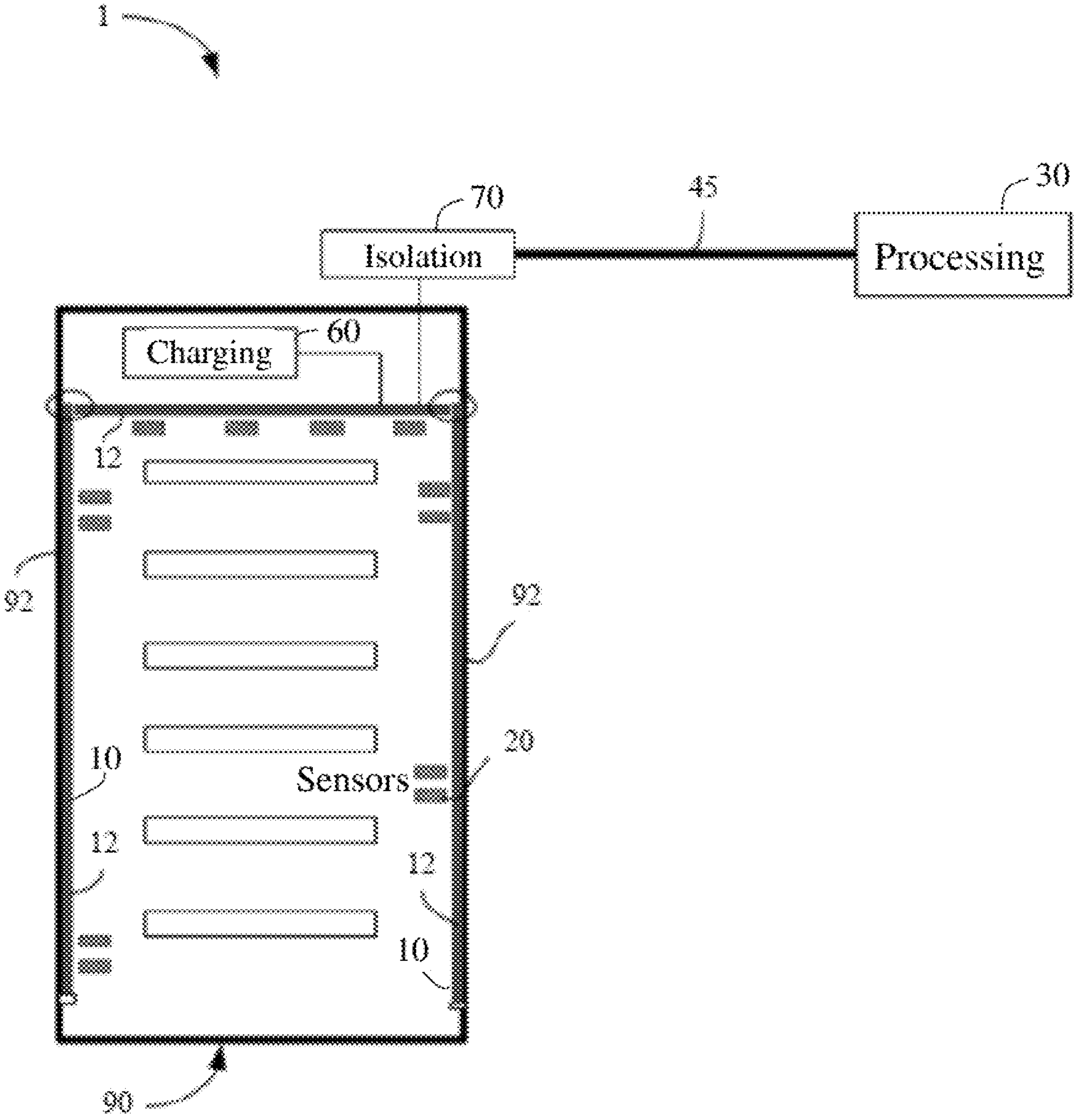
FIG. 7 is a diagram of a sensor system according to yet another example implementation of the present disclosure.

In some embodiments, as shown in FIG. 3 to FIG. 5 and FIG. 7, the processing apparatus 30 may be disposed outside the to-be-measured body 90, and is coupled, through a wired transmission component or a wireless transmission component, to the transmission apparatus 10 installed on the to-be-measured body 90. In this way, it is ensured that the processing apparatus 30 can remotely learn of to-be-measured information in the to-be-measured body 90 without entering the to-be-measured body 90. FIG. 3 to FIG. 5 show a wireless transmission manner, and FIG. 7 shows a wired transmission manner, which will be further described in detail below. In some other embodiments, as shown in FIG. 6, the processing apparatus 30 may alternatively be disposed in space formed by the to-be-measured body 90. In this way, the transmission apparatus 10 directly communicates with the passive sensor 20 without using a relay antenna outside the cabinet, to read and process the sensing signal from the passive sensor 20. The processing apparatus 30 may be powered by a collector in the to-be-measured body 90, and may transmit environment information such as a temperature read by the passive sensor 20 to the central control apparatus 100. Compared with a conventional far-field antenna manner, the manner shown in FIG. 6 can reduce coverage blind spots and improve signal reading stability. In addition, because electromagnetic interference is reduced, an impedance mismatch phenomenon is not easily generated, and safety and reliability can be improved.

The following describes a wireless transmission manner according to an embodiment of the present disclosure with reference to FIG. 3 to FIG. 5. This wireless transmission manner is mainly implemented by using a wireless transmission component. The wireless transmission component includes a first antenna 41 for transmission to the transmission apparatus 10, and a second antenna 42 for transmission to the processing apparatus 30. In embodiments shown in FIG. 3 to FIG. 5, the second antenna 42 is configured to communicate with the first antenna 41, to transmit a sensor signal from the passive sensor 20 to the processing apparatus 30 through the transmission apparatus 10 by using an electromagnetic wave of a first frequency $f_1$. In this way, deployment of a transmission line outside the computer cabinet can be avoided, thereby facilitating installation and implementation.

In some embodiments, the to-be-measured body 90 may be made of metal having a shielding effect. In this embodiment, the first antenna 41 and the second antenna 42 are used, so that a loss caused by shielding of a metal material can be resolved.

In some embodiments, the first antenna 41 for transmission to the transmission apparatus may be a patch antenna, a dipole antenna, a monopole antenna, a slot antenna, or the like. This is not limited herein. Polarization of the first antenna 41 may be horizontal polarization, vertical polarization, or circular polarization. This is not limited herein either. In some other embodiments, the second antenna 42 for transmission to the processing apparatus 30 may be a patch antenna, a dipole antenna, a monopole antenna, a slot antenna, or the like. This is not limited herein. Polarization of the second antenna 42 may be horizontal polarization, vertical polarization, or circular polarization. This is not limited herein either.

In some embodiments, as shown in FIG. 3 or FIG. 4, the sensor system 1 may further include a charging apparatus 60. The charging apparatus 60 may be coupled to the transmission apparatus 10. The charging apparatus 60 charges the passive sensor 20 by using an electromagnetic wave of a second frequency $f_2$. In some embodiments, the second frequency $f_2$ used for charging may be unequal to the first frequency $f_1$ used for communication, to avoid mutual interference between a charging process and a communication process. In another embodiment, the second frequency $f_2$ used for charging may be equal to the first frequency $f_1$ used for communication. This is not particularly limited in embodiments of the present disclosure. The passive sensor 20 is charged through the charging apparatus 60, and the passive sensor 20 is continuously in an active state. The processing apparatus 30 sends an instruction to request the passive sensor 20 to report information, reads the information from the passive sensor 20 through the first antenna 41 and the second antenna 42, and may demodulate the information.

In some embodiments, the charging apparatus 60 may be a continuous wave exciter. According to this embodiment of the present disclosure, the continuous wave exciter is configured to additionally charge the passive sensor 20 through a structure in which charging and communication are separated from each other, to activate the passive sensor 20. The continuous wave exciter may be implemented by a voltage-controlled oscillator (VCO). An output voltage of the voltage-controlled oscillator is changed by changing a bias voltage. An excitation source may be powered by a collector configured in the computer cabinet. It should be understood that the charging apparatus 60 may be another type of charging apparatus other than the continuous wave exciter, for example, a radio frequency signal generator.

In some embodiments, as shown in FIG. 3 or FIG. 4, the sensor system 1 may further include an isolation apparatus 70 disposed between the first antenna 41 and the transmission apparatus 10. In this way, communication between the passive sensor 20 and the processing apparatus 30 is assisted through the appropriate isolation apparatus 70, thereby greatly reducing a threshold of the passive sensor 20 and increasing a read rate. According to this embodiment of the present disclosure, regardless of whether the first frequency $f_1$ used for communication is equal to the second frequency $f_2$ used for charging, an isolation apparatus 70 of a corresponding type may be disposed. For example, when the first frequency $f_1$ used for communication is equal to the second frequency $f_2$ used for charging, the isolation apparatus 70 may be a duplexer. When the first frequency $f_1$ used for communication is not equal to the second frequency $f_2$ used for charging, the isolation apparatus 70 may be a filter.

In some embodiments, as shown in FIG. 4, the sensor system 1 may be further provided with a distribution apparatus 80 between the isolation apparatus 70 and the transmission apparatus 10. In a specific embodiment, the distribution apparatus 80 may be a directional coupler. As shown in FIG. 4, an input end of the distribution apparatus 80 is connected to the isolation apparatus 70, a first output end of the distribution apparatus 80 is connected to the charging apparatus 60, and a second output end of the distribution apparatus 80 is connected to the transmission apparatus 10. The charging apparatus 60 can charge the passive sensor 20 based on a signal from the distribution apparatus 80. In this way, the charging apparatus 60 does not need to continuously charge the passive sensor 20, but properly charges the passive sensor 20 based on an actual requirement. The charging may be periodic or aperiodic. In conclusion, energy can be appropriately used in this on-demand charging manner. In some embodiments, the distribution apparatus 80 may be implemented in another form. For example, the distribution apparatus 80 may alternatively be a power splitter.

In some embodiments, as shown in FIG. 5, the sensor system 1 may further include a power amplifier 50. The power amplifier is coupled between the transmission apparatus 10 and the processing apparatus 30, and is configured to amplify a sensor signal from the transmission apparatus 10. In this way, the sensor signal has been amplified to ensure good signal quality. In this case, the charging apparatus 60 may be omitted. In a case in which transmission is performed in a wireless manner shown in FIG. 5, the power amplifier 50 may be disposed between the transmission apparatus 10 and the first antenna 41.

The following describes a wired connection manner according to an embodiment of the present disclosure with reference to FIG. 7. As shown in FIG. 7, the first antenna 41 and the second antenna 42 are not disposed between the processing apparatus 30 and the transmission apparatus 10 in the to-be-measured body 90, but are connected by through a wired transmission component 45. In some embodiments, the wired transmission component 45 may be a component like a coaxial cable, a waveguide, a spoof surface plasmon polariton, or an optical fiber, and can extend from the outside of the to-be-measured body 90 to the inside of the to-be-measured body 90 through an air vent on the cabinet.

As shown in FIG. 7, the sensor system 1 may further include the isolation apparatus 70. The isolation apparatus 70 may be disposed between the wired transmission component 45 and the transmission apparatus 10. The computer cabinet is still used as an example. If a radio frequency transmission apparatus is used outside the cabinet, the isolation apparatus 70 may be a filter, a duplexer, or the like. In some other embodiments, the isolation apparatus 70 may alternatively be integrated into the radio frequency transmission apparatus. For example, a parameter like a cut-off frequency of the radio frequency transmission apparatus is adjusted, so that the radio frequency transmission apparatus transmits only a signal of a frequency band to which a communication signal belongs, and does not transmit a signal of a frequency band to which a charging signal belongs. In some other embodiments, if an optical fiber transmission apparatus is used outside the cabinet, the optical fiber transmission apparatus may be combined with an optical/electrical conversion apparatus. A function of the optical/electrical conversion apparatus is to convert a radio frequency signal from the transmission apparatus 10 inside the cabinet into an optical signal, and then transmit the optical signal to the processing apparatus 30 through an optical fiber. In addition, the optical/electrical conversion apparatus may alternatively convert an instruction sent by the processing apparatus 30 into a radio frequency signal, and transmit the radio frequency signal to the transmission apparatus 10 inside the cabinet. The isolation apparatus 70 needs to be disposed between the transmission apparatus 10 inside the cabinet and the optical/electrical conversion apparatus, to prevent a charging signal inside the cabinet from being transmitted to a receiving apparatus outside the cabinet. The isolation apparatus 70 may be a filter, a duplexer, or the like, or may be integrated into the optical/electrical conversion apparatus. For example, the optical/electrical conversion apparatus supports conversion of only an electrical signal in a frequency band into an optical signal.

In some embodiments, as shown in FIG. 3 to FIG. 7, the to-be-measured body 90 includes a plurality of body parts 92 that are movable relative to each other. For example, in a use scenario of the computer cabinet, the body part 92 may be a wall and a door that are of an equipment room configured to accommodate the computer cabinet. The door can be opened or closed relative to the wall of the equipment room. In some embodiments, the transmission apparatus 10 may include a plurality of adjacent transmission sections 12. These transmission sections 12 may be mounted on different parts of the to-be-measured body 90. For example, some transmission sections 12 are mounted on a fixed wall, ceiling, or ground of the equipment room, and some other transmission sections 12 are mounted on a movable door of the equipment room. As the door is opened and closed, a distance between these transmission sections 12 may change accordingly. As shown in FIG. 3 to FIG. 7, each transmission section 12 has two end parts. In some embodiments, the end part may be connected to a waveguide through an adapter element. In some embodiments, when the plurality of body parts 92 are on a first relative position (for example, when the door of the computer room is in a closed state), a distance between a waveguide connected to an end part of a transmission section 12 and a waveguide connected to an end part of an adjacent transmission section 12 is less than a second threshold. In other words, in this case, these transmission sections 12 are close to each other.

Figure 8:
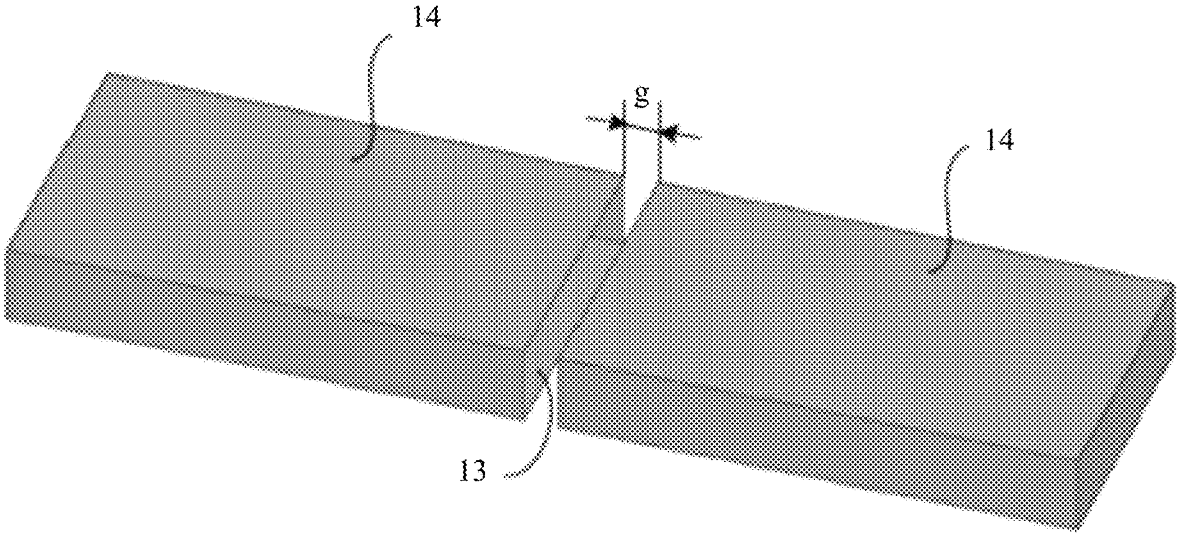
FIG. 8 is a diagram of a waveguide according to yet still another example implementation of the present disclosure.

The following uses the computer cabinet as an example to describe a structure and a working manner of a waveguide according to an embodiment of the present disclosure. Refer to FIG. 3 to FIG. 7. A waveguide is used as a non-contact coupling structure, and transmission sections 12 at different body parts 92 (for example, front and rear doors of a cabinet body of the cabinet) of the to-be-measured body 90 are connected to a transmission section 12 on a top, the transmission section 12 on the top is connected to a relay antenna outside the cabinet through, for example, the air vent on the cabinet, so that the processing apparatus 30 reads information from the passive sensor 20. For the non-contact coupling structure, FIG. 8 shows two opposite waveguides 14 each having an opening 13. In some embodiments, four walls of the waveguide 14 may be made of metal, for example, copper or aluminum. The inside of the waveguide 14 may be not filled or filled with a medium. As shown in FIG. 8, one end of the waveguide 14 has an opening 13, which is opposite to an opening 13 of the other waveguide 14, and the other end of the waveguide 14 is used for connecting the waveguide 14 to a transmission section 12, so as to be connected to a transmission section 12 on the front door or rear door. The other end of the other waveguide 14 is similar. In this way, when the front door or the rear door of the cabinet is closed, the waveguides 14 are close to each other, so that a signal is conducted. The transmission section 12 on the front door or the rear door may transmit a signal to the transmission section 12 on the top of the cabinet through the waveguides 14, then to the relay antenna outside the cabinet, and finally to a signal receiving apparatus, so that an environmental parameter is monitored in real time. When the front door or the rear door is opened, because the distance g between the waveguides 14 at the end parts of the transmission sections 12 is greater than the second threshold, signal interruption is caused and information cannot be read. Through the non-contact coupling apparatus, damage to a transmission line structure caused by opening and closing the door for a plurality of times or frequently can be avoided. In one case, when the cabinet door is opened, information may be directly read through an air interface via an antenna connected to the processing apparatus 30.

In a manner of using a passive relay antenna, a waveguide, as a non-contact coupling structure, is connected to the transmission segment on the top, and is connected to the relay antenna outside the computer cabinet, so that one processing apparatus 30 reads sensor information of a plurality of to-be-measured bodies 90 (for example, the cabinet). In this way, a loss of the cabinet door is reduced, and a quantity of processing apparatuses 30 and costs and complexity of line deployment are reduced.

In some embodiments, the end part of the transmission section 12 may include a magnetic element (not shown), and magnetic elements are configured to attract each other when the end part and the end part of the adjacent transmission section 12 are close to each other. This helps align the end part of the transmission section 12 to the end part of the adjacent transmission section 12.

In some embodiments, a near-field antenna or another microstructure may be added to the transmission apparatus 10, to improve a coupling degree between the transmission apparatus 10 and the passive sensor 20. Particularly, in a scenario in which the computer cabinet is used, a near-field coupling technology is used, so that an impedance mismatch caused by a metal cabinet body and a server in the cabinet can be avoided, electromagnetic interference in the cabinet is reduced, and security and reliability are improved. In addition, in another embodiment, the transmission apparatus 10 may alternatively be connected to a far-field antenna, to improve signal coverage, so as to improve location flexibility of the passive sensor 20. In some other embodiments, a microstrip leaky-wave antenna may alternatively be used directly, to resolve a problem of uneven energy distribution in the cabinet when a single antenna is used.

Refer back to FIG. 1. In the embodiment shown in the figure, specific settings of the sensor systems 1 may be the same or may be different. A sensor system 1 that matches the to-be-measured body 90 may be provided for the to-be-measured body 90 based on different use requirements. For example, some to-be-measured bodies 90 may use the sensor system 1 shown in FIG. 3, and some other to-be-measured bodies 90 may use the sensor system 1 shown in FIG. 5.

It should be understood that the details shown in embodiments described above are not isolated from each other, but may be combined with each other. Such a combination also falls within the scope of embodiments of the present disclosure. For example, in a case of wired transmission shown in FIG. 7, the power amplifier 50, the charging apparatus 60, the isolation apparatus 70, or the distribution apparatus 80 shown in FIG. 3 to FIG. 6 may also be disposed.

An embodiment of the present disclosure further relates to a method for the sensor system 1 described above. The method includes: sensing the to-be-measured information inside the to-be-measured body 90 through the passive sensor 20; and processing the sensing signal from the passive sensor 20 through the processing apparatus 30. The sensing signal reflects the to-be-measured information inside the to-be-measured body 90.

In some embodiments, the method may further include: controlling an operation of the passive sensor 20 through the transmission apparatus 10. In some embodiments, the passive sensor 20 may be turned on and turned off by controlling charging. In some other embodiments, communication of the passive sensor 20 may be further controlled.

It should be understood that the method described herein may be used together with the sensor system 1 described above and components inside the sensor system 1, for example, the power amplifier 50, the charging apparatus 60, the isolation apparatus 70, or the distribution apparatus 80. For brevity, more details of the method are not described herein.

Compared with a conventional solution, this embodiment of the present disclosure can resolve a problem of uneven energy distribution caused by metal blocking inside the to-be-measured body through a conformal transmission apparatus disposed on the to-be-measured body, reduces coverage blind spots, reduces electromagnetic interference, and has flexibility of a specific extent. In addition, a signal reading distance of the passive sensor is increased by using a structure in which charging and communication are separated, so that an advantage of low costs of the passive sensor is retained and performance of the passive sensor is enhanced.

Although the subject matter is described in a language specific to structural features and/or method logic actions, it should be understood that the subject matter defined in the appended claims is not necessarily limited to the particular features or actions described above. On the contrary, the particular features and actions described above are merely example forms for implementing the claims.

The invention claimed is:

1. A sensor system comprising:
- a transmission apparatus, disposed on an inner surface of a to-be-measured body;
- at least one passive sensor, disposed on the inner surface of the to-be-measured body and at a distance less than or equal to a first threshold from the transmission apparatus, wherein the passive sensor is configured to sense to-be-measured information inside the to-be-measured body;
- a charging apparatus, coupled to the transmission apparatus and configured to charge the passive sensor;
- a first antenna configured to transmit to the transmission apparatus;
- an isolation apparatus disposed between the first antenna and the transmission apparatus; and
- a distribution apparatus disposed between the isolation apparatus and the transmission apparatus, wherein an input end of the distribution apparatus is connected to the isolation apparatus, a first output end of the distribution apparatus is connected to the charging apparatus, and a second output end of the distribution apparatus is connected to the transmission apparatus, wherein
- the charging apparatus is configured to charge the passive sensor based on a signal of the distribution apparatus.

2. The sensor system according to claim 1, further comprising:
- a processing apparatus, coupled to the transmission apparatus and configured to process a sensor signal from the passive sensor.

3. The sensor system according to claim 2, wherein the processing apparatus and the transmission apparatus are connected through a wired transmission component.

4. The sensor system according to claim 2, wherein the processing apparatus is disposed outside a space formed by the to-be-measured body, and the sensor system further comprises:
- a second antenna configured to transmit to the processing apparatus, and configured to communicate with the first antenna, to transmit the sensor signal from the passive sensor to the processing apparatus through the transmission apparatus by using a first electromagnetic wave of a first frequency.

5. The sensor system according to claim 4, herein:
- the charging apparatus is configured to charge the passive sensor by using a second electromagnetic wave of a second frequency.

6. The sensor system according to claim 5, wherein the isolation apparatus comprises a duplexer, and the duplexer is configured to work when the first frequency is equal to the second frequency.

7. The sensor system according to claim 5, wherein the isolation apparatus comprises a filter, and the filter is configured to work when the first frequency is not equal to the second frequency.

8. The sensor system according to claim 5, wherein the charging apparatus comprises a continuous wave exciter or a radio frequency signal generator.

9. The sensor system according to claim 2, further comprising:
- a power amplifier, coupled between the transmission apparatus and the processing apparatus and configured to amplify the sensor signal from the transmission apparatus.

10. The sensor system according to claim 2, wherein the processing apparatus is disposed inside a space formed by the to-be-measured body.

11. The sensor system according to claim 2, wherein the processing apparatus and the transmission apparatus are connected in a wireless manner.

12. The sensor system according to claim 1, wherein the distribution apparatus comprises either of a directional coupler or a power splitter.

13. The sensor system according to claim 1, wherein the transmission apparatus comprises a non-closed transmission line.

14. The sensor system according to claim 1, wherein the transmission apparatus is coupled to a near-field antenna.

15. The sensor system according to claim 1, wherein the transmission apparatus is coupled to a far-field antenna.

16. The sensor system according to claim 1, wherein the at least one passive sensor is a humidity sensor and the to-be-measured body is a computer cabinet.

17. The sensor system according to claim 1, wherein the at least one passive sensor is a temperature sensor and the to-be-measured body is a computer cabinet.

18. A sensor system comprising:

a transmission apparatus, disposed on an inner surface of a to-be-measured body; and at least one passive sensor, disposed on the inner surface of the to-be-measured body and at a distance less than or equal to a first threshold from the transmission apparatus, wherein the passive sensor is configured to sense to-be-measured information inside the to-be-measured body; and wherein the to-be-measured body comprises a plurality of body parts that are movable relative to each other, the transmission apparatus comprises a plurality of adjacent transmission sections, each transmission section is located on a corresponding body part and has two end parts, and one of the end parts is connected to a waveguide through an adapter element; and when the plurality of body parts are on a first relative position, a distance between the waveguide connected to one of the end parts of the transmission section and the waveguide connected to another one of the end parts of an adjacent transmission section is less than a second threshold.

19. The sensor system according to claim 18, wherein the end parts respectively comprises a magnetic elements, and the magnetic elements are configured to attract each other when the one of the end parts of the transmission section is close to the another one of the end parts of the adjacent transmission section, so that the one of the end parts of the transmission section is aligned to the another one of the end parts of the adjacent transmission section.

* * * * *